3,468,672
FRITTED SLAB FREEZE-DRYING
Henry Schwartzberg, Hartsdale, N.Y., assignor to General Foods Corporation, White Plains, N.Y., a corporation of Delaware
No Drawing. Filed Dec. 14, 1965, Ser. No. 513,835
Int. Cl. A23f *1/08;* F26b *7/00, 5/06*
U.S. Cl. 99—71           3 Claims

ABSTRACT OF THE DISCLOSURE

The rate of vacuum freeze-drying a frozen granular material is increased by compressing the granulated material into a porous slab prior to freeze-drying. The method has special efficacy in drying highly concentrated extracts.

---

This invention relates to a method for improving the rate for freeze-drying of aqueous liquids containing solids and more particularly to a method for improving the rate for freeze-drying coffee.

Various methods and techniques of freeze-drying of, for example, frozen extracts, concentrates, purees, juices, soluble coffee and other foodstuffs are known in the art. The known processes, however, have suffered from numerous disadvantages among which are the requirement of an extraordinarily long period of time to effect the desired reduction in moisture content, complex and cumbersome equipment, and often, products of poor quality.

Probably the main disadvantage of the known processes resides in the length of time required to drive off the moisture contained in the foodstuff. In the known methods of freeze-drying roasted coffee extract, for example, about 15–25 hours are required to dry the frozen coffee to a desirable product moisture content. This has been found to be so when utilizing known methods even where condenser temperatures as low as −60° F. and pressures of in the range of 50–500 microns of mercury are used. This inherent disadvantage of the prior art processes has been found to exist in the case of large bodies (frozen layers or slabs) of coffee extract as well as granulated or subdivided frozen extract. By way of definition, the term "Freeze-drying," as used herein, means the removal of water by the technique of sublimation and removal of water vapor under vacuum, i.e., the direct passage of the frozen water from the solid state to the vapor state and the subsequent removal of the vapor. In the case of coffee extract, for example, the sublimation and vapor removal normally occurs under vacuum at a pressure of about 500 microns of mercury and below. It is known to those skilled in the art that in utilizing the technique of freeze-drying of frozen extracts, concentrates, purees, juices and other foodstuffs, the sublimed vapors escape from the body of the frozen material by passing through the "pores" or passageways formed by the previously sublimed ice. It may readily be appreciated that these "pores" generally have extremely small diameters and follow tortuous pathways through the material. Because of these factors the passage from the frozen material is greatly restricted, hence the speed and rate of freeze-drying in the known processes is severely limited.

Further, it was discovered that when freezing a large body of an extract in the form of a slab, sheet or thick layer, the extract appears to form a low permeability film or coating on the surface thereof during freezing. It has been theorized that this low permeability film impedes the rate of freeze-drying by acting as an additional barrier to the removal of water vapors from the interior portions of the extract. Supporting this theory is the fact that the drying time of, for example, coffee slabs, has been found to be directly proportional to the thickness of the slab rather than proportional to the, theoretically surmised, thickness squared. While the heat transfer throughout the body of frozen and partly dried extract during drying is adequate and presents no serious problem, removal of sublimed vapors is impeded by the impervious frozen surface film or coating.

Attempts have been made to obviate the vapor removal problem by subdividing or granulating the frozen extract subsequent to freezing so as to remove or destroy the surface film. By such subdividing or granulating, vapor escape has been very much facilitated so as to be removed as a limiting step in the freeze-drying process. However, use of the granulated or subdivided particles has presented a further limitation on the process. The frozen extract in particle form resists the transfer of the heat necessary to produce sublimation by reason of the presence of voids between each particle. The voids hinder the transfer of heat from particle to particle and, therefore, decrease the rate of sublimation. Also, when small particles are used dried particles tend to become entrained in escaping water vapors due to fluidization of the bed during drying and thus are lost.

Attempts have been made to overcome the above mentioned transfer problem by, for example, the use of drying trays having a multiplicity of heat-conducting metallic fins, or agitated beds. However, these alternatives have proven to be relatively expensive procedures in the drying of particulate frozen materials.

In accordance with this invention a simple, practical and economic method of freeze-drying is provided whereby the rate of vapor removal is substantially increased without substantially decreasing the heat transfer rate of the extract.

It is, therefore, one object of the present invention to provide a method for rapid freeze-drying of frozen extracts.

An important object of the invention is the provision of a process which enables greater productivity or drying per unit volume of dryer space.

It is also an object of the invention to provide a process in which the speed and rate of drying is substantially increased and the total drying time for high concentration material is substantially less than that required for low concentration materials.

Another object of the present invention is to provide a frozen extract for freeze-drying in the form of a porous slab which permits greater ease of vapor escape than from solid slabs but yet retains the necessary heat conductivity to insure rapid sublimation.

One of the main objects of the invention is the provision of a process which substantially eliminates any restriction on vapor release to the end that the good thermal conductivity simultaneously achieved may be advantageously used when drying materials of high solid concentration.

Still another object of the present invention is the provision of highly porous beds of frozen material to be dried which exhibit a degree of thermal conductivity heretofore not achieved in the art.

One of the most important objects of the present invention is the provision of highly porous beds of frozen material to be dried which enable great load densities and substantially little, if any, solids entrainment during the drying operation.

In accordance with this invention, these objects and advantages, as well as others, are realized by the provision of a process for increasing the rate for removing water vapor from a frozen extract during vacuum freeze-drying without substantially decreasing the heat transfer rate of said frozen extract which comprises grinding the frozen extract, concentrate, puree, juice or other material to be dried into small granules, compacting the particles to form a porous slab and subjecting the porous slab to vacuum freeze-drying to sublime the frozen liquid in the extract. It is to be understood that the term "compacting" is meant to include forcibly compressing fritted material into a porous slab.

In carrying out the process of this invention, frozen extract, concentrate, puree, juice or other material is initially ground or granulated into small or fine frozen particles of the extract material. Thereafter, masses of the small particles are compacted to form porous slabs of the frozen extract. The compacting can be carried out by the use of a ram and a mold, the compacting pressure being applied by either a hydraulic press or clamping device. It is to be understood that other compacting devices to achieve a compressed, fritted slab may be utilized advantageously. The porosity of the slabs may be controlled within desired units by control of the weight of frozen material within a given slab volume. This will serve as a guide in determining the porosity of each individual slab.

The size of the frozen granules should be large enough so that the inter-particle pores in the subsequently generated porous slab are substantially (e.g. 2 to 3 times) larger than the pores produced within the particles by the sublimation of their ice content. Stated in other terms, the particles size should be large enough so that in conjunction with the degree of compaction used in generating the fritted slab there is little or no resistance offered to the efflux of sublimed water vapor.

In compacting the frozen granules the degree of compaction should be so adjusted as to provide an ultimate slab porosity which is adequate for maintaining the required ease of vapor escape. However, it is desirable not to greatly exceed the minimum porosity which is compatible with meeting this end since this minimum porosity will provide the greatest amount of product loading per available shelf area and increased heat transfer.

The granular material being formed into the slab should be compacted in such a way as to provide good particle to particle thermal contact. One means of doing this is to maintain the temperature of the material being compacted at a temperature slightly above its minimum melting point but substantially below its initial freezing point during the compacting operation.

After formation of the porous slab, the freeze-drying technique is carried out. As pointed out hereinbefore, the freeze-drying step embodies the vacuum removal of water from the extract. The water is removed by sublimation in that it passes from the solid state directly to the vapor state without passing through the intermediate liquid state. Using the porous slabs of this invention, the freeze-drying step is carried out in a substantially rapid manner with substantially little or no loss of particles by entrainment in the vapor thus assuring high product yields.

The frangibility or ease of breakup after drying the porous slabs can be controlled by the temperature at which the original compaction is carried out. Compaction at some temperatures above the eutectic temperature of the material, but below its initial freezing point produces a porous slab that holds together well. Compaction within these guidelines also produces a slab exhibiting excellent thermal conductivity.

It has been theorized that the advantages obtained by the freeze-drying method of this invention are obtained by reason of the fact that the evolved vapor is easier and more rapidly removed than in the solid slabs as the impeding surface film is not present on the instant porous slabs and because the resultant network of pores offer less resistance to vapor flow than the pores provided by the ice structure in a solid slab. Moreover, the heat necessary to sustain vapor evolution is conducted more efficiently and economically than with loose particles. Therefore, greater productivity per unit volume of dry space can be obtained than with loose particles because of the greater density of the compacted porous slab. Further- more, as no loose particles are present, entrainment losses are eliminated.

These advantages are particularly marked in drying preconcentrated materials such as high concentration coffee extracts and the following specific working examples exemplify this embodiment. At high solids concentrations, there are fewer and/or finer paths for vapor escape in the solid slabs and therefore, even though there is less water to remove, the total drying time is frequently the same for high and low concentration materials. It will be readily apparent that utilizing the method of this invention, the restrictions on vapor release are eliminated, to the end that the improved thermal conductivity of porous solids at high concentration may be advantageously used.

The invention will now be specifically described by the following specific examples, the examples being intended merely as illustration of specific embodiments and in no way as limiting the invention.

Example I

Porous slabs of a frozen coffee extract were made by compacting ground particles of the frozen extract. The frozen particles had a 28% soluble solids concentration. The compacting was carried out by the use of wooden rams and a wooden mold, the pressure being applied by a hydraulic press. The resultant porous or fritted slabs were one-half inch deep by three inches wide and three inches long. The slabs were made at porosities ranging from 10% to 30%.

The fritted slabs were then placed in a vacuum freeze dryer and dried at the maximum platen temperatures compatible with maintaining the slab surface temperature at or below 110° F. After eight to nine hours approximately 90% of the water had been removed and it is estimtaed drying would have been complete in 10 hours. In no instance was there evidence of meltback during the drying process. The temperature of the undried portion of the slabs remained at about −36° F. to −40° F. with a box pressure of 40 to 50 microns, indicating very little resistance to vapor release.

Example II

A porous slab was prepared from 45% extract by the process described in Example I. The slab was five-sixteenth inches deep, three inches wide and three inches long. The slab had a porosity of about 20% and thus contained about as much soluble matter as in the previous example.

The slab was placed in a vacuum freeze dryer similar to that of Example I and dried at a slab surface temperature at or below 110° F. After two and one-half hours, about 90% of the water in the slab was removed and, according to the drying rate, the drying would have been completed in a total of about three to three-and-one-quarter hours. The drying was accomplished using a heating platen temperature of 260° F., which temperature is greatly in excess of the temperature which would normally cause melting in solid slabs of this concentration. This example shows that the technique used in the instant invention circumvents the limitations on vapor escape inherent in the drying of highly concentrated material.

While this invention has been described by reference to specific examples directed to frozen coffee extracts, it is understood that the broad concepts of this invention are applicable to other frozen extracts, concentrates, purees, juices, etc. Therefore, the invention is to be limited only by the scope of the following appended claims.

What is claimed is:

1. A process for increasing the vapor removal rate for frozen coffee extract during vacuum freeze-drying without substantially decreasing the heat transfer rate of said frozen extract which comprises grinding said extract into granular particles, compacting said ground frozen extract into a porous slab, and vacuum freeze-drying said porous slab maintained at a temperature slightly above the minimum melting point but substantially below the initial freezing point.

2. A process according to claim 1 wherein the porous slab is compacted by pressure.

3. A process according to claim 1 wherein the coffee extract is concentrated to a high solids level difficult to sublime.

References Cited

UNITED STATES PATENTS 3,096,163 7/1963 Meryman _____ 34—43
3,297,455 1/1967 Ogden _____ 99—199 X MAURICE W. GREENSTEIN, Primary Examiner U.S. Cl. X.R.

34—5; 99—199